United States Patent [19]

Fowler

[11] Patent Number: 4,745,515

[45] Date of Patent: May 17, 1988

[54] ELECTRICALLY OPERATED CONTROL DEVICE AND SYSTEM FOR AN APPLIANCE AND METHOD OF OPERATING THE SAME

[75] Inventor: Daniel L. Fowler, Kentwood, Mich.

[73] Assignee: Robertshaw Controls Company, Richmond, Va.

[21] Appl. No.: 869,137

[22] Filed: May 30, 1986

[51] Int. Cl.[4] ...................... H02H 7/00; H01H 47/28; G05F 1/10

[52] U.S. Cl. ........................................ 361/185; 361/3; 323/235

[58] Field of Search ....................... 323/235, 236, 319; 219/492; 361/3, 185

[56] References Cited

U.S. PATENT DOCUMENTS

| | | | |
|---|---|---|---|
| 4,275,464 | 6/1981 | Schmidt | 371/15 |
| 4,306,263 | 12/1981 | Gray et al. | 361/3 |
| 4,356,525 | 10/1982 | Kornrumpf et al. | 361/3 |
| 4,568,927 | 2/1986 | Fowler | 200/11 TW |
| 4,670,810 | 6/1987 | Valeur | 323/319 |

*Primary Examiner*—L. T. Hix
*Assistant Examiner*—David Porterfield
*Attorney, Agent, or Firm*—Candor, Candor & Tassone

[57] ABSTRACT

An electrically operated control device and system for an appliance and method of operating the same are provided, the system comprising a power source of alternating electrical current that has a repeating voltage wave cycle and a repeating current wave cycle, a load for using the electrical current to provide an output of the load for the appliance, a relay having normally open contacts and a coil for closing the contacts only when the coil is energized, an electrical circuit for interconnecting the power source to the load through the contacts only when the contacts are closed, and a control unit for causing the coil to close the contacts substantially at a certain point on the voltage wave cycle each time the relay coil closes the contacts from the open condition thereof whereby the current flow through the contacts at each closing thereof is at substantially a desired level thereof.

4 Claims, 2 Drawing Sheets

ELECTRICALLY OPERATED CONTROL DEVICE AND SYSTEM FOR AN APPLIANCE AND METHOD OF OPERATING THE SAME

BACKGROUND OF THE INVENTION

1. Field of the Invention

This invention relates to a new electrically operated control device and system for an appliance as well as to a method of operating the same.

2. Prior Art Statement

It is known to provide a control system for an appliance wherein the system comprises a power source of alternating electrical current that has a repeating voltage wave cycle and a repeating current wave cycle, load means for using the electrical current to provide an output of the load means for the appliance, relay means having normally open contact means and coil means for closing the contact means only when the coil means is energized, and electrical circuit means for interconnecting the power source to the load means through the contact means only when the contact means are closed.

It is also known in the art to use solid state control means in a control device for an appliance to synchronize the switching of an AC power source to a load means, such load means being an inductive load means, a capacitive load means or a resistive load means. Such synchronous switching is used to minimize the current inrush for the load means.

In particular, inductive loads such as motors, solenoids, power transformers, etc. typically have an inductive as well as resistive current response to an AC power source, such as 120 volts AC 60 Hertz. The inductive response results in the current lagging the voltage by a phase angle up to 90 degrees for a purely inductive load. To minimize inrush current, the voltage is applied to the inductive load when the phase angle of the AC power is 90 degrees and the inductive load current is respectively at its lowest value. This is commonly referred to as Crest-firing where the preferred firing and/or switching is made at the crest of the AC power source which is 90 degrees or the complement 270 degrees phase angle. An example of the practice of this technique is switching power to a magnetron power supply of a microwave oven. Typically a triac is used to apply AC power to the highvoltage power transformer when the AC line is at crest and/or 90 degrees. The peak load current decreases when the firing angle approaches 90 degrees, which is due to the reactive impedance response of the inductive load. In the case of the peak currents at firing angles approaching 0 degrees, they are typically at a maximum level which is limited by the source resistance of the AC supply and the resistive component of the load. Resistive loads, such as a cal-rod heating element used in electric ranges, have a current to voltage phase relationship of 0 degrees. Therefore, minimum current inrush is achieved when the AC power source is at 0 degrees. Synchronous switching of loads at 0 degrees is commonly called zero cross switching.

It is also believed that in large power stations that generate electrical current, certain generating equipment is brought on line at substantially a desired level of the voltage cycle of that line.

SUMMARY OF THE INVENTION

It is a feature of this invention to provide a new electrically operated control system for an appliance wherein the relay means for interconnecting a power source of alternating electrical current to a load means of the appliance is operated in such a manner that the contact means of the relay means closes from the open condition thereof substantially at a certain point on the voltage wave cycle of the power source so that the current flow through the contact means at each closing thereof is at substantially a desired level thereof.

In this manner, it is believed that the life of the contacts of the relay means will be increased because the normal arcing of the contacts caused by contact bounce upon each closing thereof will be held to a lower level than is provided when the contacts close randomly in relation to the voltage wave cycle of the power source. In addition, such closing of the relay contacts can provide the desired synchronous switching of the AC power source to the load means as is provided in the solid state controls for the reasons previously described.

It is believed that because electrical relay contact life is degraded by contact arcing and/or burning of the contacts due to the plasma arcing, there is an apparent performance improvement in reducing the peak power of the switched inductive load. If the peak switched load power is reduced, peak voltage times peak current, arcing energy is also reduced and electrical relay contact wear out is extended. Zero cross switching of resistive loads is believed to also greatly extend the life of relay contacts, because both the voltage and the current being switched are at very low values. Therefore the arcing of the relay contacts is greatly reduced or eliminated.

Thus, one embodiment of this invention provides a control system for an appliance, the system comprising a power source of alternating electrical current that has a repeating voltage wave cycle and a repeating current wave cycle, load means for using the electrical current to provide an output for the load means for the appliance, relay means having normally open contact means and coil means for closing the contact means only when the coil means is energized, electrical circuit means for interconnecting the power source to the load means through the contact means only when the contact means are closed, and control means for causing the coil means to close the contact means substantially at a certain point on the voltage wave cycle each time the relay coil means closes the contact means from the open condition thereof whereby the current flow through the contact means at each closing thereof is at substantially a desired level thereof.

It is another feature of this invention to provide a new control system for an appliance wherein the contact means of the relay means open substantially at a certain point on the voltage wave cycle each time the relay coil means open the contact means from the closed condition thereof.

For example, another embodiment of this invention provides a control system for an appliance, the system comprising a power source of alternating electrical current that has a repeating voltage wave cycle and a repeating current wave cycle, load means for using the electrical current to provide an output of the load means for the appliance, relay means having normally open contact means and coil means for closing the contact means only when the coil means is energized and for effectively opening the contact means when the coil means is deenergized, electrical circuit means for interconnecting the power source to the load means through the contact means only when the contact means are closed and to disconnect the power source from the load means through the contact means when the contact means are open, and control means for causing the coil means to open the contact means substantially at a certain point on the voltage wave cycle each time the relay coil means opens the contact means from the closed condition thereof whereby the voltage across the contact means at each opening thereof is at substantially a desired level thereof.

Accordingly, it is an object of this invention to provide a new electrically operated control system for an appliance, the system of this invention having one or more of the novel features of this invention as set forth above or hereinafter shown or described.

Another object of this invention is to provide a new electrically operated control device for an appliance, the device of this invention having one or more of the novel features of this invention as set forth above or hereinafter shown or described.

Another object of this invention is to provide a new method of operating an electrically operated control system for an appliance, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
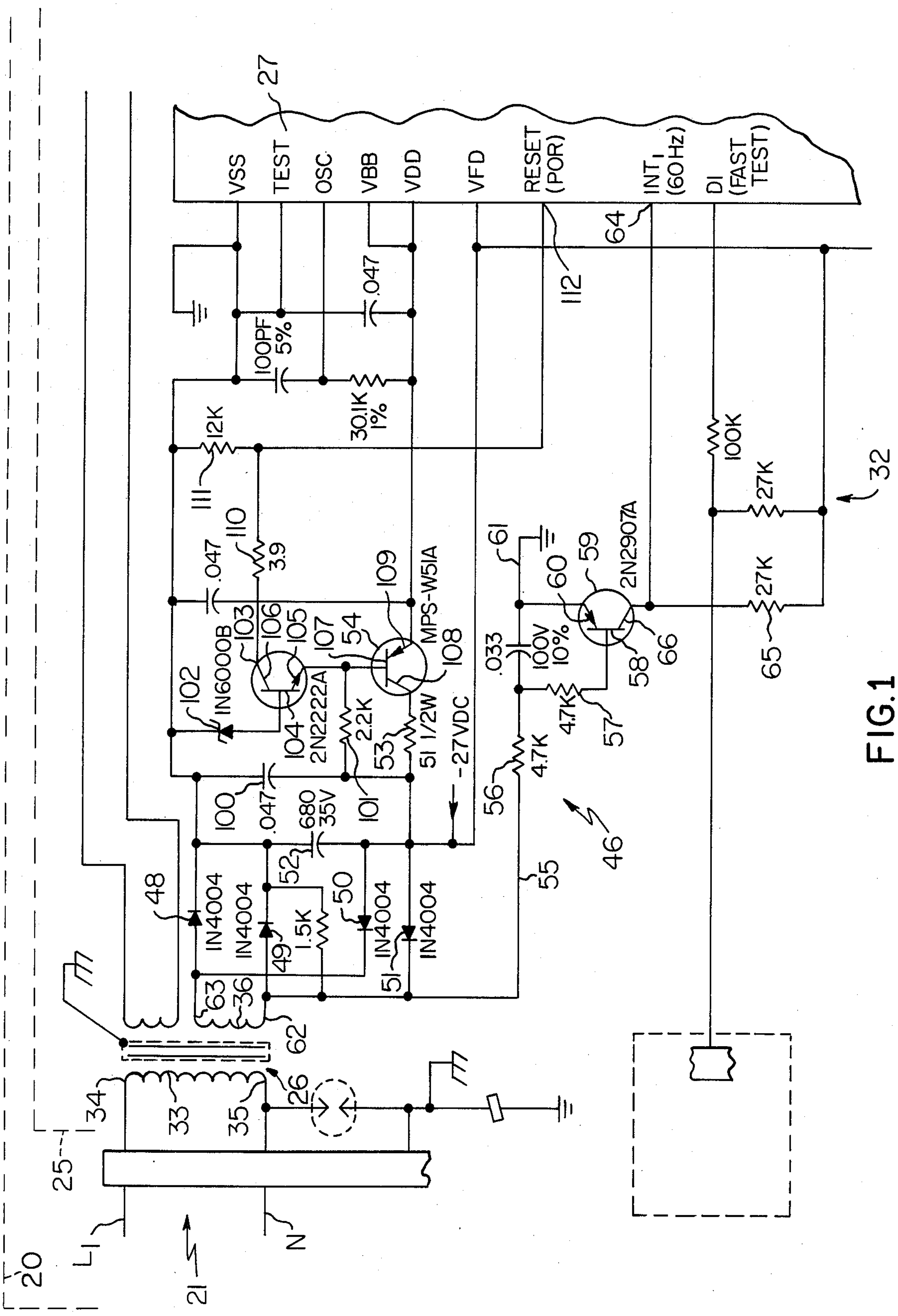
FIG. 1 is a fragmentary view illustrating part of the new electrically operated control system and control device of this invention.

While the various features of this invention are hereinafter illustrated and described as being particularly adapted to provide a control device and system for a particular electrical circuit means for a microwave oven, it is to be understood that the various features of this invention can be utilized singly or in various combinations thereof to provide an electrically operated control device and system for other types of appliances as desired.

Therefore, this invention is not to be limited to only the embodiment illustrated in the drawings, because the drawings are merely utilized to illustrate one of the wide variety of uses of this invention.

Figure 2:
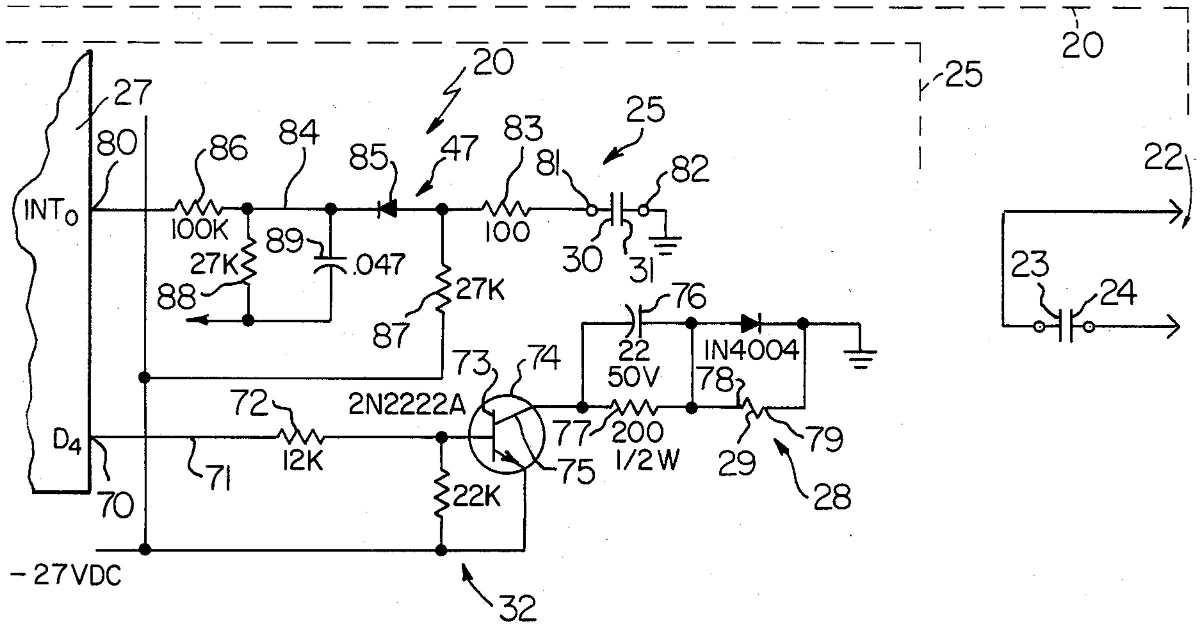
FIG. 2 is a view similar to FIG. 1 and illustrates another part of the new control system and control device of this invention.

Referring now to FIGS. 1 and 2, the new control system of this invention is generally indicated by the reference numeral 20 and comprises an electrical power source 21 of alternating electrical current that has a repeating voltage wave cycle and a repeating current wave cycle, such as a conventional 120 volt, 15 amp, 60 cycle alternating current source that is normally provided in a home or building for operating appliances. Such electrical power source 21 is illustrated in FIG. 1 as comprising line L1 and line N.

The control system 20 of this invention also includes a load means that is generally indicated by the reference numeral 22 in FIG. 2 and such load means 22 comprises a magnetron unit for a microwave oven (such appliance not being shown) that utilizes the control system 20 as illustrated in FIGS. 1 and 2, the load means 22 being interconnected to the power source 21 in a manner well known in the art when a pair of relay contacts 23 and 24 close and being disconnected from the power source 21 when the relay contacts 23 and 24 open.

Such cyclic operation of the load means 22 of a microwave oven under the control of relay contacts is well known in the art as evidenced by the control systems disclosed in the applicant's U.S. Pat. No. 4,568,927 and the Schmidt U.S. Pat. No. 4,275,464, whereby these two patents are being incorporated into this disclosure by the reference thereto.

The control system 20 of this invention includes a control device that is generally indicated by the reference numeral 25 in FIGS. 1 and 2 that is utilized to control the operation of the load means 22, the control device 25 comprising a transformer means 26, a microprocessor 27, and a conventional electrically operated relay means that is generally indicated by the reference numeral 28 and comprising an electrical coil means 29 and the first pair of electrical contact means 23 and 24 as well as a second set of contact means 30 and 31. The control device 25 also comprises an electrical circuit means that is generally indicated by the reference numeral 32 in FIGS. 1 and 2 and is adapted to cause the coil means 29 of the relay means 28 to close the contact means 23 and 24 substantially at a certain point on the voltage wave cycle of the power source 21 each time the relay coil means 29 closes the contact means 23 and 24 from the normal open condition thereof whereby the current flow through the contact means 23 and 24 is at a substantially desired level thereof as will be apparent hereinafter.

The relay means 28 of the control system 20 of this invention is conventional in the art and has an armature means (not shown) that substantially simultaneously closes the two pairs of contacts 23, 24 and 30, 31 from the normally open conditions thereof when the relay coil means 29 is energized and which effectively causes the two pairs of contact means 23, 24 and 30, 31 to open when the coil means 29 is deenergized.

However, it is well known that when an electrical current is initially directed to the coil means 29 of the relay means 28, a certain lag time period or pull in time exists before the contacts 23, 24 and 30, 31 respectively close. Similarly, there is a certain time lag period that elapses from the time the electrical current that is being directed to the coil means 29 of the relay means 28 is terminated until the time the contacts 23, 24 and 30, 31 open.

The circuit means 32 of this invention is so constructed and arranged as hereinafter set forth that the same is adapted to begin to energize the coil means 29 with the power source 21 at substantially a desired lead point on the voltage wave cycle of the power source 21 so as to tend to cause the contact means 23 and 24 to subsequently close substantially at a certain point on the voltage wave cycle each time the load means 22 is to be interconnected to the power source 21 so that the control means or device 25 of this invention compensates for the time lag period or pull in time that exists for the relay means 28 between the desired lead point on the voltage wave cycle and the certain point thereon.

In addition, the control means or device 25 of this invention has means to sense this time lag or pull in time and has means to automatically adjust the desired lead point on the voltage wave cycle should the sensed lag time or pull in time on a certain previous cycle of operation of the relay means 28 not cause the contact means 23 and 24 to close substantially at the certain point on the voltage wave cycle in order to tend to cause the contact means 23 and 24 to close substantially at that certain point during future cycles of operation of the load means 22.

The transformer 26 has a primary coil 33 that has its opposite ends or pins 34 and 35 adapted to be respectively interconnected to the power source leads L1 and N, the transformer 26 having a secondary coil 36 that will step down the voltage of the power source 21 to a desired lower voltage. The control system 20 of this invention has the transformer 26 provide a voltage in the secondary 36 of approximately 21 volts AC whereby the voltage wave cycle and current wave cycle produced in the secondary 36 of the transformer 26 substantially corresponds to the voltage cycle and current wave cycle that occurs in the primary coil 33. However, should there be any minor differences between the voltage and current wave cycles of the primary coil means 33 and the voltage and current wave cycles induced in the secondary coil means 36, this difference is a constant and the microprocessor 27 can be programmed to take into consideration such differences as will be apparent hereinafter.

The voltage wave cycle of the power source 21 is schematically illustrated by the line 37 on the graph of FIG. 3 wherein the Y axis 38 represents voltage and the X axis 39 represents time, the voltage wave cycle 37 being positive when above the X axis 39 and being negative when below the X axis 39 as is well known in the art.

Figure 3:
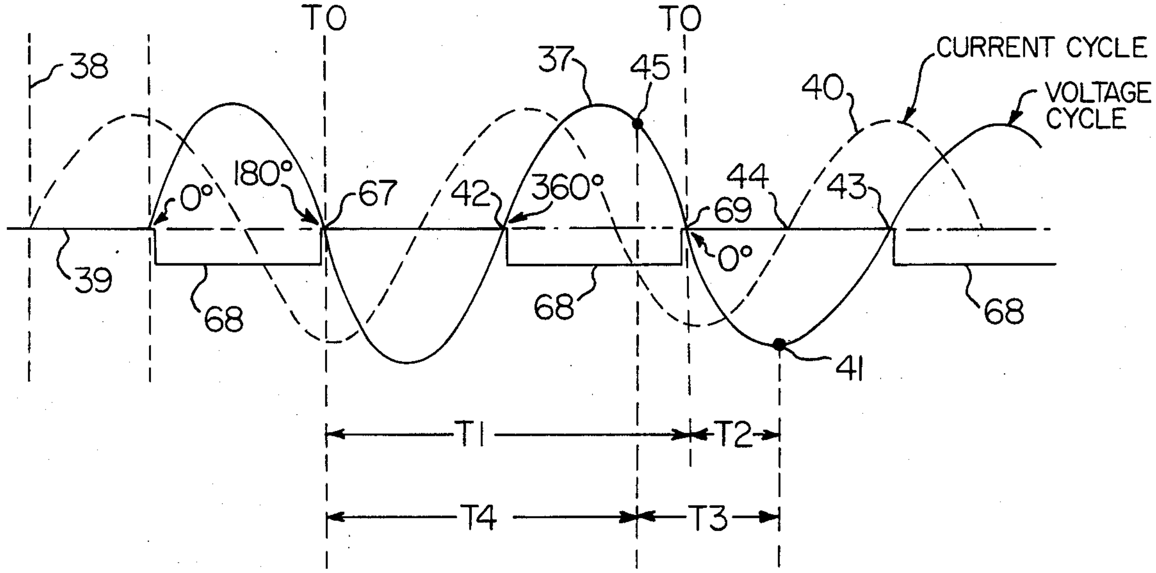
FIG. 3 is a schematic view of the voltage and current wave cycles of the power source of the control system of FIGS. 1 and 2 and indicates the various operating features of this invention thereon.

The current wave cycle of the power source 21 is represented by the dashed line 40 on the graph of FIG. 3 and is shown as being 90° out of phase with the voltage wave cycle 37 illustrating load means 22 as a purely inductive load whereas the current wave cycle 40 would be in phase with the voltage wave cycle 37 should the load means 22 be a resistive load means, such as is provided by a resistive electrical heating element of an appliance as is well known in the art.

As will be apparent hereinafter, it has been found according to the teachings of this invention that it is desired that the contacts 23 and 24 of the relay means 28 close when a certain point 41 on the voltage wave cycle 37 occurs and such certain point 41 on the voltage wave cycle 37 is at the phase angle of 270° of each 360° cycle thereof such as that occurs between the points 42 and 43 thereof. It can be seen that when the voltage wave cycle 37 is at the point 41, the current wave cycle 40 is at the point 44 which is at zero cross and thus is at the lowest amp value thereof so that the combination of the points 41 and 44 on the voltage wave cycle 37 and the current wave cycle 40 will produce the least amount of arcing at the relay contacts 23 and 24 when the same initially close and thereby undergo contact bounce as is well known in the art.

However, if the load means 22 was a resistive load means, there would be no phase shift between the voltage wave cycle and the current wave cycle and the desired point on the voltage wave cycle would be at zero cross (where the voltage and current wave cycle would cross the X axis 39) as the voltage and current would be a minimum at this time and thereby place a minimum effect on the relay contacts 23 and 24.

In order to provide for the closing of the contacts 23 and 24 substantially when the voltage wave cycle 37 is at a point 41 thereon, the relay coil means 29 must be initially interconnected to the power source 21 at a lead point on the voltage wave cycle 37 before the point 41 thereon is reached in order to compensate for the lag time or pull in time required by the relay means 28 as previously described.

Such lead point is indicated by the reference numeral 45 on the voltage wave cycle 37 in FIG. 3 and the lag time or pull in time is indicated as T3 in FIG. 3 for the particular relay means 28.

Thus, the circuit means 32 of this invention, in a manner hereinafter set forth, is adapted to initially interconnect the power source 21 (as reduced by the transformer 26) to the coil means 29 of the relay means 28 when the lead point 45 on the voltage wave cycle 37 occurs each time it is desired to close the contact means 23 and 24 so as to interconnect the load means 22 to the power source 21 so that when the just energized coil means 29 through its armature actually closes the relay contacts 23 and 24, such closing will occur when the voltage wave cycle 37 of the power source 21 is at the certain point 41.

While the lag time or pull in time T3 for a particular relay means 28 will be different than such lag time or pull in time T3 for another relay means 28, the microprocessor 27, in a manner hereinafter set forth, will adjust the location of the point 45 on the voltage wave cycle 37 to correspond to the particular pull in or lag in time T3 of the relay means 28. In addition, the circuit means 32 of this invention, in a manner hereinafter set forth, will change the point 45 on the voltage wave cycle 37 as the particular relay means 28 being used with the system 20 of this invention undergoes aging and/or environmental changes that changes the pull in and/or lag time T3 thereof during the operation of the system 20 of this invention.

In this manner, it can be seen that the control system 20 of this invention is adapted to cause the coil means 29 of the relay means 28 to close the contact means 23 and 24 substantially at a certain point 41 on the voltage wave cycle 37 of the power source 21 each time the relay coil means 29 closes the contact means 23 and 24 from the normally open condition thereof whereby the current flow through the contact means 23 and 24 is at a substantially desired level thereof, the circuit means 32 of this invention having means to begin to energize the coil means 29 with the power source 21 at substantially a desired lead point 45 on the voltage wave cycle 37 thereof so as to tend to cause the contact means 23 and 24 to subsequently close substantially at the certain point 41 on the voltage wave cycle each time the load means 22 is to be interconnected to the power source 21 whereby the circuit means 32 compensates for the lag time or pull in time T3 of the relay means 28 and such lag time or pull in time is the time between the desired lead point 45 and the certain point 41 on the voltage wave cycle 37 of the power source 21. In addition, the system 20 of this invention has means to sense the lag time or pull in time T3 of the relay means 28 and has means to automatically adjust the desired lead point 45 should the sensed lag time or pull in time T3 on a certain previous cycle of operation not cause the contact means 23 and 24 to close substantially at the certain point 41 in order to tend to cause the contact means 23 and 24 to close substantially at the certain point 41 during future cycles of operation of the load means 22.

A part 46 of the circuit means 32 illustrated in FIG. 1 senses the phase angle of the voltage wave cycle 37 of the power source 21 and a part 47 of the circuit means 32 as illustrated in FIG. 2 senses the lag time or pull in time of the relay means 28 by using the contacts 30 and 31 thereof as will be apparent hereinafter.

The particular details of the control system 20 of this invention for operating in the manner previously described will now be described.

As previously stated, the voltage at the secondary coil 36 of the transformer 26 is a 21 volt alternating current source that is in phase with the main power supply 21. The 21 volts alternating current in the circuit means 32 is rectified by diodes 48, 49, 50 and 51 which develop a minus 27 volt direct current across a capacitor 52. This minus 27 volt direct current, in turn, is used for the supply voltage for the relay coil 29 and it is also regulated down further through resistor 53 and transistor 54 to provide a minus 10 volt direct current supply for the microprocessor 27. In this manner, the minus 27 volt direct current is the relay power supply and is not regulated whereby the voltage of the minus 27 volt direct current will fluctuate with line voltage which will effect the pull in performance of the relay 28. Typically, the lower the line voltage the lower the relay supply voltage will be and correspondingly the pull in time of the relay 28 will also be extended or increased. It is desirable that the minus 27 volt direct current for the relay supply be at a high level to achieve minimum pull in time or the shortest possible pull in time.

The 21 volt alternating current out of the transformer 26 is also used as a reference for detecting the zero cross of the main power supply voltage, such as when the voltage wave line 37 crosses the X axis 39 of the graph of FIG. 3. This is accomplished by means of the transistor resistor circuit 55 that has the resistors 56 and 57 therein and which applies voltage to the base 58 of a transistor 59. The emitter 60 of transistor 59 is tied to the power supply common 61. As the voltage input at the transformer pin 62 goes negative with respect to the transformer pin 63 the voltage at resistor 56 will go negative with respect to the power supply ground. This, in turn, will apply a negative going voltage to the base 58 of transistor 59 with respect to the emitter 60 and will cause the transistor 59 to turn on. When transistor 59 turns on, a positive potential or ground potential is applied to the input port 64 of the microprocessor 27. Normally this port 64 is biased to the relay supply voltage which is minus 27 volts direct current by means of a resistor 65. Therefore, as the alternating current power supply conducts voltage in a negative part of its voltage wave form or the negative half cycle, transistor 59 is biased on. When the alternating current voltage wave form goes through its positive cycle, the voltage potential through resistors 56 and 57 to the base 58 of the transistor 59 is positive with respect to the emitter 60 and the transistor 59 is turned off. Therefore, the voltage wave form that is seen at the collector 66 of the transistor 59 is a square wave that is similar to the rectified negative half cycle of the alternating voltage wave form. The transistor 59 is biased on approximately minus 0.7 of a volt below the positive ground reference. This typically would represent a voltage phase angle of less than 5°. Referring to the alternating voltage source this would be an approximate phase angle of 185°. Thus, the trigger point or reference point that is being established is on the negative half cycle of the main voltage wave form 37 of FIG. 3 and is approximately 5° after the 180° zero cross, such point being indicated by reference numeral 67 in FIG. 3. This 5° is typically due to the threshold turn on voltage required for transistor 59. A small additional factor of phase shift from the primary 33 to the secondary 36 of the transformer 26 could also be taken into account in the calculations.

In summary, the output of transistor 59 is a square wave signal that goes between ground potential 0 volts DC and minus 27 volts DC which is the reference voltage that the collector 66 of the transistor 59 is biased to through resistor 65. This wave form is indicated by reference numeral 68 in FIG. 3 and is directly proportional to the negative half cycle of the voltage wave form 37 of the power supply 21 and therefore will conduct or be biased in a positive direction during this negative half cycle.

The initial turn on of the transistor 59 is used by the microprocessor 27 as a reference point. The microprocessor 27, in turn, will use this zero cross reference 67 to establish a time base. This time base is a function of from one zero cross turn on time through 180° of conduction and then transistor 59 will turn off such as at point 42 in FIG. 3. Then the next time transistor 59 would turn on again which would represent 360° of conduction for the voltage reference, such as at point 69 in FIG. 3, and this would be considered to be one voltage cycle. During this period of time, the microprocessor 27 would count the pulses of an internal oscillator thereof, the internal oscillator of the microprocessor 27 can be the main reference oscillator thereof that is used for cycle execution and is conventional in the art. Such internal oscillator is a stable oscillating device over short time periods, such as over a few voltage cycles of the power supply line. The count that is derived from the internal oscillator of the microprocessor 27 is then used to derive other proportional phase angles with respect to the reference turn on of the transistor 59. Essentially, during the time from the turn on of transistor 59 at point 67 of FIG. 3 to when it is turned off at point 42 there has been 180° conduction. The transistor 59 is turned on again at approximately 360° of conduction at point 69 in FIG. 3. The count of oscillations that is taken by the internal oscillator of the microprocessor 27 then can be dividied by any ratio to derive other timing intervals for the microprocessor 27. The internal oscillator of the microprocessor 27 typically is running at a frequency of 400 Kilo Hertz. Accordingly, the microprocessor 27 has internal counters that can be used to count the number of cycles of the internal oscillator or system clock of the microprocessor over the period from one zero cross to the next zero cross which for a 60 Hertz system is typically 16.6 milliseconds. Thus, during this period of time and with the oscillator running at 400 Kilo Hertz, the number of clock cycles of the internal oscillator will be approximately 24,096 cycles. This count then can be divided by other multiples to derive other points between one zero cross point and the next subsequent zero cross point. The resolution of these derived points is a function of the magnitude of the divisor. In this manner, the microprocessor 27 can then derive preferred contact closure points along the 360° conduction of a voltage wave cycle of the power source 21.

As previously stated, the other component of the calculation to accurately close the relay contacts 23 and 24 and that needs to be derived is the time from when the relay coil 29 is energized to when the contacts 23 and 24 close. This elapsed time is called pull in time or a lag period.

The relay coil 29 is energized by a logic level that is generated by the microprocessor 27 out of a port 70 thereof. This logic level is a positive going signal with respect to the negative relay supply minus 27 volts DC. This positive voltage level is applied through a circuit 71 to a resistor 72 which, in turn, forward biases the base 73 of transistor 74 and turns it on. When transistor 74 turns on, minus 27 volts DC is switched to the collector 75 of the transistor 74 which, in turn, applies minus 27 volts DC through a capacitor 76 and a resistor 77 to the point 78 of the relay coil 29. The other side or point 79 of the relay coil 29 is connected to the positive power supply ground. Therefore, the positive going signal out of the port 70 of the microprocessor 27 will cause the relay coil 29 to energize. It is also the object of this relay driver circuit 71 to energize the relay coil 29 so as to have the electromechanical pull in time be as quick as possible. To accomplish this the relay coil 29 is energized with an over voltage condition for a short period of time. Typically, the nominal relay voltage for the coil 29 of relay 28 is 18 volts DC. Through the commutating circuit of capacitor 76 and parallel resistor 77 when transistor 74 turns on, the voltage of minus 27 volts DC is instantaneously applied through capacitor 76 to the negative pin 78 of the relay coil 29. Applying minus 27 volts DC to an 18 volt DC coil accelerates the pull in time of the relay to its minimum saturated time. That is to say, application of voltages greater than minus 27 volts DC will not result in faster pull in times of the relay coil and associated contacts.

From the point that transistor 74 turns on the voltage applied to the negative side 78 of relay coil 29 will decrease in a positive direction and therefore will reduce the voltage across relay coil 29. This occurs as the capacitor 76 charges and takes on a voltage across it. As current passes through capacitor 76 and through the relay coil 29, the voltage across resistor 77 will increase until eventually the voltage across the resistor 77 will be approximately 9 volts DC. The resistor 77 was selected to be proportional to the resistance value of the relay coil 29 such that the relay coil 29 will have 18 volts applied across it and the voltage across resistor 77 will be 9 volts DC and/or 27 volts DC minus 18 volts DC. In this manner the voltage across relay coil 29 is normal during most of its operation time. The value of resistor 77 can also be adjusted to provide voltages less than normal or nominal across the relay coil 29, such as a hold in voltage. This may have additional application advantages in reducing the amount of power dissipated by the relay coil 29. This, in turn, would help to extend the temperature operating range of the relay coil 29 by reducing the self heating of the relay coil 29, and thereby has environmental application advantages for operation at high temperatures. Typically, relay coils have an insulation system that will endure a maximum internal temperature rise of 105° C. to 130° C. depending on the class of insulation. The temperature rise of the coil must be added to the ambient temperature and this value shall not exceed the insulation rating of the relay coil. By reducing the nominal voltage across the relay coil to a safe hold in voltage, the self heating is reduced and thereby the ambient temperature the relay coil will operate in will be increased.

Accordingly, it can be seen that there is a twofold benefit of the commutating circuit of capacitor 76 and resistor 77, one benefit being to provide a short over voltage impulse to accelerate the pull in time of the relay coil 29 and the second benefit being to reduce the nominal voltage across the relay coil 29 and thereby reduce the self heating of the coil 29.

From the time that the microprocessor 27 gives the logic level to energize the relay coil 29, the time interval until the contacts 23 and 24 make is monitored by the system 20 of this invention. This monitoring is derived from the logic level at port 80 of the microprocessor 27. This logic level monitors the contact state of the relay pins 81 and 82 that are disposed on opposite sides of the relay contacts 30 and 31. The contacts 30 and 31 are parallel to the power contacts 23 and 24 which applies power to the load means 22. The relay contacts 23, 24 and 30, 31 are in parallel mechanically as well as electrically. They are in parallel mechanically in that they are operated by the same mechanical linkage and corresponding electrical armature. The specification of the relay 28 is such that these contacts 23, 24 and 30, 30 will close substantially simultaneously, such as within 400 microseconds of each other. When the relay coil 29 is energized, the logic contacts 30 and 31 close and provide a ground logic level to a resistor 83 in circuit 84. This ground potential logic level is further applied through a diode 85 and through a resistor 86 to the microprocessor input port 80. The microprocessor 27, in turn, uses this positive going logic level to derive the time interval between the energizing logic level of the relay coil 29 and the closure of the logic contacts 30 and 31. This time interval is normally referred to as the pull in time or lag period of the relay 28.

The function of other components in this relay closure sensing circuit 85 is as follows. A resistor 87 is a negative drain resistor which biases the relay contact 30 through the resistor 83 and through resistor 87 to the relay supply voltage of minus 27 volts DC. A resistor 87 provides a 1 milliamp load for the relay contacts 30 and 31 which will typically provide a means of keeping the contacts 30 and 31 electrically clean, that is, free of oxides and contaminants that would cause it to be highly resistive. Thus, the relay contacts 30 and 31 are switching into a voltage and current load rather than a dry circuit load. The diode 85, resistor 88 and a capacitor 89 provide a combination voltage level translation and noise filter circuit. The diode 85 is a voltage rectifier and the resistor 88 is a biasing resistor which biases the logic level to minus 10 volts DC. The relay contact 30 is biased to minus 27 volts DC by the resistors 83 and 87. When relay contact 30 closes, a ground level logic level is applied through resistor 83 to theanode of diode 85. The diode 85 conducts the positive logic level through to the cathode of diode 85 and to the junction of the resistor 88 and the capacitor 89. When relay contact 30 is off and is biased to minus 27 volts DC, the anode of diode 85 is biased at minus 27 volts DC and the cathode of diode 85 is biased to minus 10 volts DC through resistor 88. Therefore, when contact 30 is a closed contact with contact 31 and provides this positive logic level, the voltage potential at the cathode of diode 85 changes from minus 10 volts DC to the ground potential of approximately minus 0.7 volts DC. The capacitor 89 acts as a noise filter in that the current through resistor 83 and diode 85 must first charge the capacitor 89 to achieve a positive logic level. The rectification action of diode 85 also serves to filter and/or debounce the logic level generated by contacts 30 and 31. The value of capacitor 89 and resistor 83 are selected to minimize the effect of an RC time delay. Capacitor 89 may be omitted if a time delay is not desired. The resistor 86 is a current limiting resistor that protects the microprocessor 27 from extreme transients such as electrostatic discharge.

The pull in time or lag time period of the relay 28 is derived by the microprocessor 27 first creating a logic level at the port 70 of the microprocessor 27 which energizes the transistor 74 and turns on or energizes the relay coil 29 and then having the relay contact 30 provide a positive logic level which is monitored by the microprocessor 27 at the port 80 thereof whereby the internal microprocessor oscillator or system clock and associated counters of the microprocessor 27 are used to derive a corresponding count which can be converted to elapsed time.

Thus, it can be seen that two time intervals have been established by the microprocessor 27, namely, the time interval between two adjacent zero crosses of the voltage wave cycle or form and the time interval from the energizing of the relay coil 29 until the contacts 23 and 24 make or are considered to be closed.

The logic and calculations required to achieve the closure of the contacts 23 and 24 at a preferred point in time with respect to the zero cross of the AC power line 21 will now be described.

As noted, the time interval between two adjacent zero cross references can be derived using the internal oscillator of the microprocessor 27 and this time interval of a voltage cycle can be referenced as T1 as illustrated in FIG. 3. The time interval from a zero cross to the preferred contact closure voltage phase or point 41 on the voltage wave form 37 is a selected constant which can be referred to as interval time T2 as illustrated in FIG. 3.

Also, as previously noted, the pull in time interval of the relay 28 can be derived by the internal microprocessor oscillator and counters and this pull in time interval can be referenced as T3 as illustrated in FIG. 3.

The pull in time of a typical relay is less than 1 line cycle, typically 8 milliseconds vs. 16.6 milliseconds for a 60 Hertz voltage cycle. For this reason it is desirable to calculate a contact closure point in a subsequent cycle of the voltage reference. Therefore, the preferred contact closure time is the summation of T1 plus T2 and/or a line cycle period plus the interval from the second zero cross to the preferred contact closure time. The phase angle or time that the relay coil must be energized to achieve this preferred contact closure can be calculated by substracting the pull in time T3 from the summation of T1 plus T2 and this time can be referenced as T4 as illustrated in FIG. 3. Thus, T4 equals T1 plus T2 minus T3. It should be noted that the summation of T1 plus T2 can initiate at any zero cross reference.

The variable of this equation is T3 which is the pull in time of the relay 28. This pull in time can vary as a result of relay aging, the environmental temperature of the relay coil 29, the mechanics of the relay and the applied power supply voltage and corresponding relay coil voltage. The advantage of this circuit 32 and corresponding performance is this pull in variable T3 can be compensated by the microprocessor 27 which continually calculates a delayed firing or energization time with respect to a zero cross reference to achieve a desired contact closure at a desired time and/or point on the voltage wave form.

Therefore, the microprocessor 27 will change the lead point 45 on the voltage wave cycle 37 should the closing of the contacts 30 and 31 not occur at the desired point 41 on the voltage wave cycle 37 in order to cause the contacts 30 and 31 and, thus, contacts 23 and 24 to close as close as possible at the point 41 on the next cycle of operation of the load means 22.

There are alternate means of detecting relay pull in time vs. the parallel relay contact arrangement as previously described. For example, one means is a transistor circuit that monitors the coil current to determine when the relay armature completes its magnetic circuit because in a typical relay operation, the coil current decreases momentarily when the magnetic circuit of the armature is mechanically completed. This decreasing of coil current can be detected by a peak sample and hold circuit that will approximate the pull in of the armature and corresponding linkages that operate the relay contact. Another means of detecting pull in time would be an electronic circuit that monitors the voltage and/or power applied to the load. If electrical isolation is desired between the load and microprocessor logic circuits, this device could be an optically coupled isolator that is applied in parallel or across the load to sense a voltage being applied to the load. Another method would be a resistor in series with the load and an electronic device across this resistor that would detect the presence of current through this reference resistor. Another means would be a current transformer that is in series with the load that would detect the full current through the load. It is believed that this current transformer could be an impulse or high frequency detector which would only monitor impulses or transients that are caused by the first making of the contact. Another means might be a piezo-electric device that is activated by the closure of the contact applying power to the load which, in turn, creates a piezo-electric response that can be electrically transmitted back to the microprocessor.

Of course, the microprocessor 27 could be programmed to have a fixed time T3 for a particular relay means 28 and therefore not need to sense the pull in time of the relay means 28 as previously described whereby the microprocessor 27 would always fire or energize the coil means 29 of the relay means at the predetermined and fixed point 45 on the voltage wave cycle 37.

As previously stated, the microprocessor 27 and system 20 of this invention could, in lieu of or in addition to operating the making of the relay contacts 23 and 24 in the manner previously described, operate the breaking or opening of the contacts 23 and 24 in substantially the same manner by selecting a desired lead point on the voltage wave cycle 37 that the microprocessor 27 is to deenergize the relay coil means 29 so that the contacts 23 and 24 will subsequently open at the certain point on the voltage wave cycle 37 where the voltage angle will be at the desired angle, such as at a zero cross thereof where the voltage is zero.

It is to be understood that the dropout time T3 can be derived in a similar manner as the pull in time, namely the microprocessor 27 deenergizes the relay coil 29 by turning off the transistor 74, which correspondingly opens contacts 30 and 31. The microprocessor port 80 can recognize the corresponding logic state change from a ground potential to a minus 10 V DC potential and thereby derive an elapsed time T3 from the deenergizing logic command until the opening of the relay contacts 30 and 31.

It is also to be understood that the selected points on the voltage wave cycle 37 for making and/or breaking the relay contacts 23 and 24 could be at any location on the voltage wave cycle 37 and need not be the point previously described because it may be desired to have the relay contacts 23 and 24 close and/or open at such other points on the voltage wave cycle for other reasons whereby this invention is not to be limited to any specific point or points on the voltage wave cycle 37.

Also, while certain values of the components of the circuit means 32 are illustrated in the drawings, wherein all diodes are IN4148, all capacitance values are in microfarads, ±20%, 50 V and all resistance values are in Ohms, ±5%, ¼ Watt, unless otherwise noted in the drawings, it is to be understood that such values are not to be a limitation on this invention.

The substitution of a fixed program time T3 can also be executed by the microprocessor 27 for the first relay pull in cycle after a power on reset.

It is common practice to provide a means of resetting and/or initializing a microprocessor when a source of AC power is first applied or decreases to a non operational level.

The preferred embodiment of this invention incorporates a power on reset circuit means that is an integral part of the minus 10 volts DC regulated voltage supply for the microprocessor 27. As noted earlier, a source of unregulated minus 27 volts DC is developed across power supply filter capacitor 52. From this supply voltage, regulation down to minus 10 volts DC and a power on/off logic reset signal for microprocessor 27 is provided as follows: the minus 27 volts DC is applied to the junction of resistor 53, resistor 101 and capacitor 100.

The capacitor 100 is a high frequency filter capacitor.

The resistor 53 has two functions, namely acting as a voltage dropping resistor and as a short circuit current limiting resistance. The value of resistor 53 is selected to drop a preferred magnitude of voltage prior to the series pass regulating transistor 54. This, in effect, will reduce the amount of power the passed transistor 54 must dissipate in the linear active mode of operation and also protects transistor 54 should the emitter output 109 and/or the regulated minus 10 volt DC become accidentally shorted to a ground potential or other damaging circuit point.

The resistor 101 is a current biased resistor for the zener reference voltage that is established by zener diode 102 and the base emitter junction of transistor 103, and, also is a turn on current biased resistor for transistor 54. The value of resistor 101 is selected to provide a preferred current thorugh these zener diode reference components, zener diode 101 and transistor 103, such that the voltage at the base 107 of transistor 54 is at a substantially saturated zener voltage reference level when minus 27 volts DC is developed across the power supply filter capacitor 52. This saturated zener reference voltage at the base 107 of the transistor 54 is used to modulate the current through the transistor 54 and the voltage drop from the collector 108 to the emitter 109 of the transistor 54 such that the emitter output of transistor 54 and/or minus 10 volt DC is regulated at a voltage equal to the summation of the zener reference voltage at the base of transistor 54 plus the base emitte voltage drop of the transistor 54. The regulated voltage at the emitter output of the transistor 54 will be maintained for a large range of unregulated voltage at a collector input of passed transistor 54 such as supplied by the minus 27 volts DC under normal operating conditions of its corresponding AC power source.

The current gain of the transistor 54 is also selected to provide adequate regulation for a desired range of minus 10 volt DC load current.

The magnitude of the regulated DC voltage at the emitter of transistor 54 and/or regulated minus 10 volts DC is the summation of the voltages developed by the zener diode 102 plus the base emitter junction voltages of transistors 103 and 54. This type of series pass transistor voltage regulation is well known in the art. However, an improvement to this type of circuit is the addition of transistor 103 which also provides a reset and/or initialization means for the microprocessor 27. This is accomplished in conjunction with the bias current that flows through the base emitter junction of the transistor 103 to maintain the zener reference voltage at the base of the transistor 54 and the corresponding regulated voltage at the emitter of the transistor 54.

When the minus 27 volts DC is at a saturated level to maintain this bias current, it should be noted that the transistor 103 is biased in a saturated on state such that it will sink the bias current of the resistors 110 and 111 and will switch the voltage level at the emitter 105 of the transistor 103 and the collector 106. This voltage level is a negative logic zero potential and is interfaced to the reset input 112 of the microprocessor 27 through the resistor 110. This is the normal on state and will allow the microprocessor 27 to execute its modes of operation.

When the minus 27 volt DC developed across the capacitor 52 decreases to a level that is not sufficient to maintain the bias current of the zener reference voltage components including the base emitter junction of the transistor 103, the transistor 103 turns off and ceases to sink the bias current of the resistors 110 and 111. This, in turn, allows the bias current of the resistor 111 to pull up the reset input 112 of the microprocessor 27 to a ground and/or positive logic one level. This logic one level is the normal off state which resets and/or forces the microprocessor 27 to its initial program counter address in the output ports to preferred initial state.

As noted earlier, the minus 27 volt DC is derived from the AC power source 21. When the AC power source 21 is initiated from an off state to an on state the minus 27 volt DC will proportionately increase from zero volts DC to minus 27 volts DC. The bias current through the zener reference components, zener diode 102 and the base emitter junction of transistor 103, will not conduct until the minus 27 volt DC supply voltage reaches a magnitude greater than their combined zener reference voltage.

Prior to reaching this voltage potential, the transistor 103 is biased off in a reset logic one level if applied to the reset input 112 of the microprocessor 27.

Also prior to reaching saturation of the zener reference voltage at the base of the transistor 54, the bias current through the resistor 101 will cause the transistor 54 to conduct in a saturated on mode. This, in effect, applies a voltage proportional to the instantaneous level of the minus 27 volt DC at the emitter output of transistor 54. Thus, the magnitude of the regulated minus 10 volt DC will increase proportional to the minus 27 volt DC supply until the zener reference voltage at the base of the transistor 54 goes into saturation at which time the minus 10 volt DC will become regulated as noted earlier.

At this point, current will also flow through the zener reference components, including the base emitter junction of transistor 103, which turns on the transistor 103 and applies a logic zero level to the reset input 112 of the microprocessor 27 to enable normal operation as noted earlier.

However, it should be noted that whenever the voltage level of the minus 27 volt DC supply is not sufficient to maintain the zener reference voltage in a saturated mode and a corresponding regulated minus 10 volt DC in a regulated state, the microprocessor reset input 112 is forced to the reset and/or initialization logic state. This function is well known in the art as a power on reset means and can be used to reset and/or initialize a microprocessor such as to select a fixed program time T3 for the first pull in cycle of a relay.

Further improvements that are not shown is the addition of a resistance across the base 104 and emitter 105 of the transistor 103. This will improve the turn off threshold of the transistor 103 and will allow zener bias current to flow through zener diode 102 prior to the turn on of the transistor 103. Also, a capacitor can be added in parallel with the resistor 112 to shape the rise and fall times of the reset signal that is applied to the reset input 112 of the microprocessor 27.

Therefore, it can be seen that this invention not only provides a new electrically operated control system and control device for an appliance, but also this invention provides a new method of operating such a control system.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control device for a control system for an appliance wherein said system comprises a power source of alternating electrical current that has a repeating voltage wave cycle and a repeating current wave cycle and load means for using said electrical current to provide an output of said load means for said appliance, said control device comprising relay means having normally open contact means and coil means for closing said contact means only when said coil means is energized, and electrical circuit means for interconnecting said power source to said load means only through said contact means to provide said output and only when said contact means are closed by said coil means, the improvement comprising control means for causing said coil means to close said contact means substantially at a certain point on said voltage wave cycle each time said relay coil means closes said contact means from said open condition thereof whereby the current flow through said contact means at each closing thereof is at substantially a desired level thereof.

2. A control device as set forth in claim 1 wherein said control means comprises a microprocessor.

3. A control device as set forth in claim 1 wherein said control means has means to begin to energize said coil means with said power source at substantially a desired lead point on said voltage wave cycle thereof so as to tend to cause said contact means to subsequently close substantially at said certain point on said voltage wave cycle each time said load means is to be interconnected to said power source whereby a lag time period exists between said desired lead point and said certain point.

4. In a control device for a control system for an appliance wherein said system comprises a power source of alternating electrical current that has a repeating voltage wave cycle and a repeating current wave cycle and load means for using said electrical current to provide an output of said load means for said appliance, said control device comprising relay means having normally open contact means and coil means for closing said contact means only when said coil means is energized, and electrical circuit means for interconnecting said power source to said load means only through said contact means to provide said output and only when said contact means are closed by said coil means, the improvement comprising control means for causing said coil means to close said contact means substantially at a certain point on said voltage wave cycle each time said relay coil means closes said contact means from said open condition thereof whereby the current flow through said contact means at each closing thereof is at substantially a desired level thereof, said control means having means to begin to energize said coil means with said power source at substantially a desired lead point on said voltage wave cycle thereof so as to tend to cause said contact means to subsequently close substantially at said certain point on said voltage wave cycle each time said load means is to be interconnected to said power source whereby a lag time period exists between said desired lead point and said certain point, said control means having means to sense said lag time and having means to automatically adjust said desired lead point should said sensed lag time on a certain previous cycle of operation not cause said contact means to close substantially at said certain point in order to tend to cause said contact means to close substantially at said certain point during future cycles of operation.

* * * * *